H. CROUT.
Street Lamp.
No. 14,087.
Patented Jan. 15, 1856.
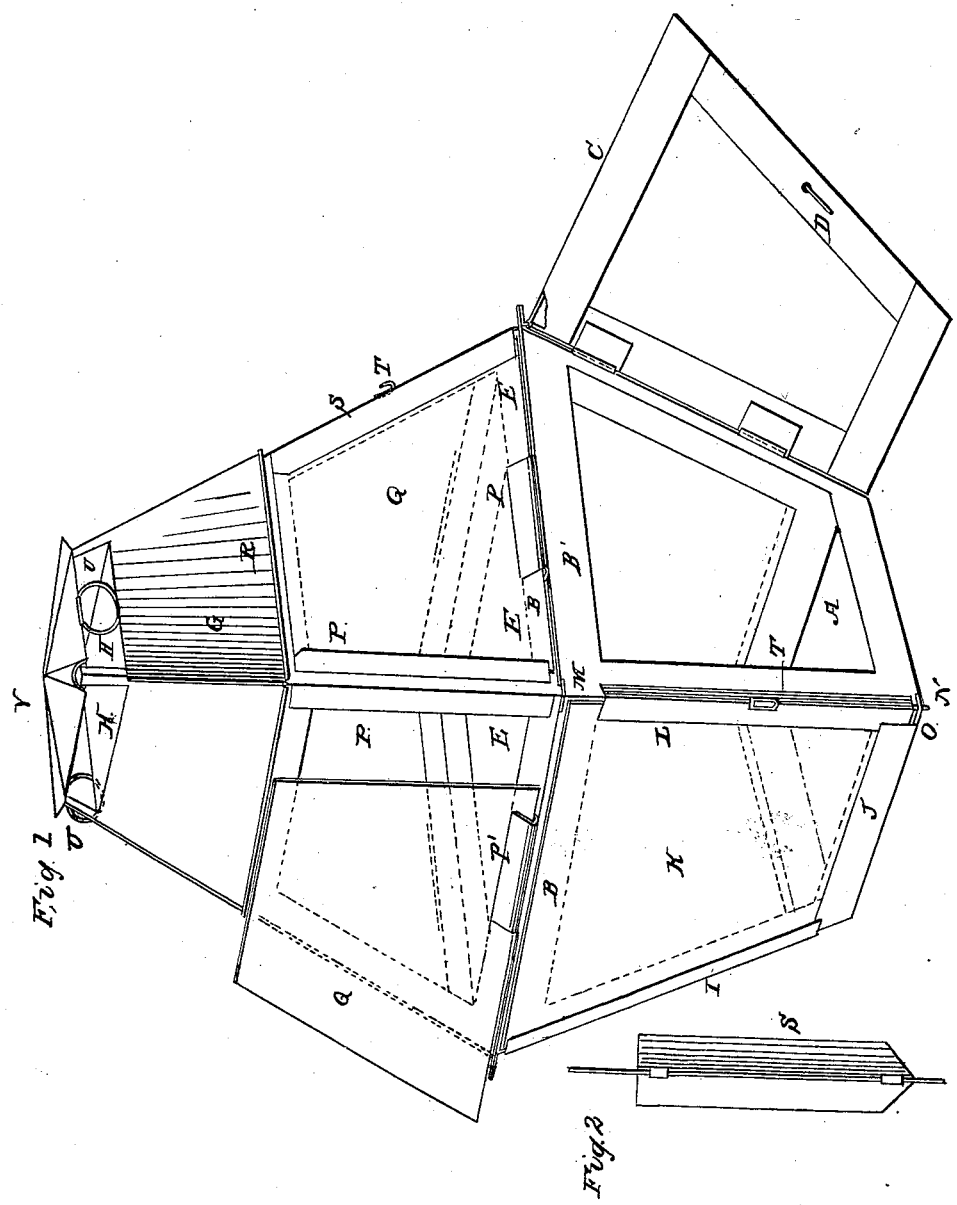

UNITED STATES PATENT OFFICE.

HEZEKIAH CROUT, OF BALTIMORE, MARYLAND.

REMOVABLE FLANCH-BAR FOR SECURING THE GLASSES OF LANTERNS.

Specification of Letters Patent No. 14,087, dated January 15, 1856.

*To all whom it may concern:*

Be it known that I, HEZEKIAH CROUT, of the city of Baltimore and State of Maryland, have invented certain new and useful Improvements in Lanterns; and I do hereby declare that the same are described and represented in the following specifications and drawings.

To enable others skilled in the art to make and use my improvements, I will proceed to describe their construction and use referring to the drawings in which the same letters indicate like parts in each of the figures.

Figure 1 is the elevation of lantern designed for lighting streets made in the form most commonly used for that purpose, but may be made in such other form as may be most desirable. The edge of the bottom A is turned up and soldered to the side frames B, B', to the latter a door C, is hinged which is represented as open, and is made in the usual manner with a bracket fastened to the frame of the door, so as to slip the glass in from the top into the groove formed for it between the frame and the bracket. This door may be fastened by turning the bent wire D. Four of the frames like B, are soldered together. At the top they are turned out and their edges are grasped by the lower edges of the top frames E, E, which are also turned out and bent over to receive the edges of the frames B, and then they are soldered together and form the flange F. Three side frames are also soldered together at their edges so as to make the corners of the lantern firm. The upper edges of the top frames are turned out and are grasped by the lower edges of the top G, which may be made in the form represented in the drawing, or of such other form as may be desirable. It is provided with openings H, H, for the escape of the products of combustion. The bottom A should be perforated to admit sufficient air to supply the light, and provided with a socket for the top of the post, or such other device as may be preferred. The cleat or bracket I, is made of tin and soldered to one side of the frame B, and a similar one J, to the lower side of said frame to sustain the glass K, which is slipped in under the flange F, and secured by the bar L, which is made of a piece of tin bent nearly at right angles, and provided with a wire pivot at each end. The upper pivot M, is slipped up through a hole in a piece of tin soldered to the flange F, for that purpose when the bar L is pressed against the corner of the lantern and glass and slipped down so as to insert the lower pivot N, into a hole in the piece of tin O soldered to the bottom A, for that purpose. Each of the top frames E, is provided with a cleat P, on one side, and P', at the bottom to hold the glass Q which is slipped in under the flange R, and cleats P and P, and secured by the bar S, which bar also secures the glass in the top on the side next beyond, but which is not seen in the drawing. The bar S is similar to the bar L, except that it is made wider so as to secure two glasses. See a representation of the inside of the bar taken from the corner diagonally opposite at Fig. 2, which bar has been removed so as to slide the glass Q', out as represented. The upper pivots of these bars slip up through openings into the top G, made for that purpose, and the lower ends are inserted in some pieces of tin, soldered to the flange F, for that purpose. The bar for the upper section are arranged on the corners which come between the corners occupied by the pivots of the lower bars as represented so that the lower pivots of the upper bars may not interfere or come in the way of the upper pivots of the lower bars. These bars are all provided with a hook T, which serves as a handle in removing them and by which they may be hung to the rings V, fastened to the cap V, of the top. By removing the bars the glass can all be taken out and washed, and replaced with the greatest facility with one-half of the labor and time heretofore required.

The following are some of the advanatges this lantern possesses over others: 1st, it is 20 per cent. cheaper, and can be kept in repair for 25 per cent. of what it costs to repair those now in use. Besides it can be kept clean at one half the expense. It now costs the city of Baltimore 37 cents to replace each pane of glass that is broken. By using my improved lantern the panes can be renewed at 15 cts. each thereby saving 22 cents.

What I claim and desire to secure by Letters Patent is—

The application of the flanged removable bar for the purpose specified.

In testimony whereof I have hereunto signed my name before two subscribing witnesses.

HEZEKIAH CROUT.

Witnesses:
 WM. D. CAPIN,
 D. FANCE.